US009228449B2

(12) United States Patent
Cloarec

(10) Patent No.: US 9,228,449 B2
(45) Date of Patent: Jan. 5, 2016

(54) ANGULAR SECTOR OF A STATOR FOR A TURBINE ENGINE COMPRESSOR, A TURBINE ENGINE STATOR, AND A TURBINE ENGINE INCLUDING SUCH A SECTOR

(75) Inventor: Yvon Cloarec, Ecuelles (FR)

(73) Assignee: SNECMA, Paris (FR)

( * ) Notice: Subject to any disclaimer, the term of this patent is extended or adjusted under 35 U.S.C. 154(b) by 585 days.

(21) Appl. No.: 13/805,211

(22) PCT Filed: Jun. 16, 2011

(86) PCT No.: PCT/FR2011/051372
§ 371 (c)(1),
(2), (4) Date: Apr. 4, 2013

(87) PCT Pub. No.: WO2011/157956
PCT Pub. Date: Dec. 22, 2011

(65) Prior Publication Data
US 2013/0223990 A1  Aug. 29, 2013

(30) Foreign Application Priority Data
Jun. 18, 2010  (FR) ...................... 10 54849

(51) Int. Cl.
F01D 25/04 (2006.01)
F01D 25/06 (2006.01)
(Continued)

(52) U.S. Cl.
CPC  F01D 25/04 (2013.01); F01D 5/26 (2013.01); F01D 9/042 (2013.01); F01D 25/06 (2013.01);
(Continued)

(58) Field of Classification Search
CPC ........... F01D 5/26; F01D 5/225; F01D 9/041; F01D 9/042; F01D 25/04; F01D 25/06; F01D 25/246; F01D 25/26; F04D 29/668; F04D 29/542; F05D 2260/96; F05D 2240/80
USPC .......................... 415/119, 209.2–209.4, 210.1
See application file for complete search history.

(56) References Cited

U.S. PATENT DOCUMENTS 2,349,187 A * 5/1944 Meyer ...................... F01D 5/16
188/322.5
2,910,269 A * 10/1959 Haworth ................. F01D 9/042
415/117
(Continued)

FOREIGN PATENT DOCUMENTS

DE  10 2007 059 220  6/2009
EP  1 811 131  7/2007
(Continued)

OTHER PUBLICATIONS

International Search Report Issued Oct. 27, 2010 in PCT/FR11/51372 Filed Jun. 16, 2011.
(Continued)

Primary Examiner — Thomas Denion
Assistant Examiner — Xiaoting Hu
(74) Attorney, Agent, or Firm — Oblon, McClelland, Maier & Neustadt, L.L.P.

(57) ABSTRACT

A stator angular sector for a turbine engine compressor including: an outer shroud and an inner shroud, and at least one vane extending radially between the shrouds. The outer shroud includes first and second mounting mechanisms for mounting the stator angular sector on a casing of the engine, which mechanisms are oriented parallel to the axis in opposite directions and connected together by an intermediate portion. The outer shroud includes at least one axial end portion extending from the intermediate portion with which at least one damper-forming insert is configured to come into contact, such that beyond a given value for amplitude of vibration of the end portion, the damper insert and the end portion are configured to move relative to each other to vary total moving mass moving with the end portion, thereby modifying vibratory behavior of the end portion.

17 Claims, 6 Drawing Sheets

(51) Int. Cl.
*F04D 29/66* (2006.01)
*F01D 5/26* (2006.01)
*F01D 9/04* (2006.01)
*F01D 25/24* (2006.01)
*F01D 5/22* (2006.01)

(52) U.S. Cl.
CPC ............ *F01D 25/246* (2013.01); *F04D 29/668* (2013.01); *F01D 5/225* (2013.01); *F05D 2240/80* (2013.01); *F05D 2260/38* (2013.01); *F05D 2260/96* (2013.01); *Y02T 50/671* (2013.01)

(56) References Cited

U.S. PATENT DOCUMENTS

| | | | | |
|---|---|---|---|---|
| 3,326,523 | A * | 6/1967 | Bobo | F01D 9/042 415/209.3 |
| 4,621,976 | A * | 11/1986 | Marshall | F01D 5/24 415/119 |
| 4,721,434 | A * | 1/1988 | Marshall | F01D 5/16 415/119 |
| 5,429,479 | A * | 7/1995 | Cordier | F01D 9/042 415/209.3 |
| 5,681,142 | A | 10/1997 | Lewis | |
| 5,846,050 | A | 12/1998 | Schilling | |
| 6,921,246 | B2 * | 7/2005 | Brainch | F01D 5/145 415/191 |
| 7,040,857 | B2 * | 5/2006 | Chiu | F01D 11/003 415/1 |
| 2004/0062652 | A1 * | 4/2004 | Grant | F01D 5/16 416/220 R |
| 2004/0145251 | A1 * | 7/2004 | Clouse | F01D 5/26 310/51 |
| 2007/0172349 | A1 | 7/2007 | Abgrall et al. | |
| 2007/0297900 | A1 | 12/2007 | Abgrall et al. | |
| 2013/0039753 | A1 * | 2/2013 | Ikeguchi | F04D 29/542 415/207 |

FOREIGN PATENT DOCUMENTS

| | | |
|---|---|---|
| EP | 1 870 562 | 12/2007 |
| EP | 1 980 715 | 10/2008 |
| WO | 2010 094277 | 8/2010 |

OTHER PUBLICATIONS

U.S. Appl. No. 13/805,142, filed Dec. 18, 2012, Cloarec.

* cited by examiner

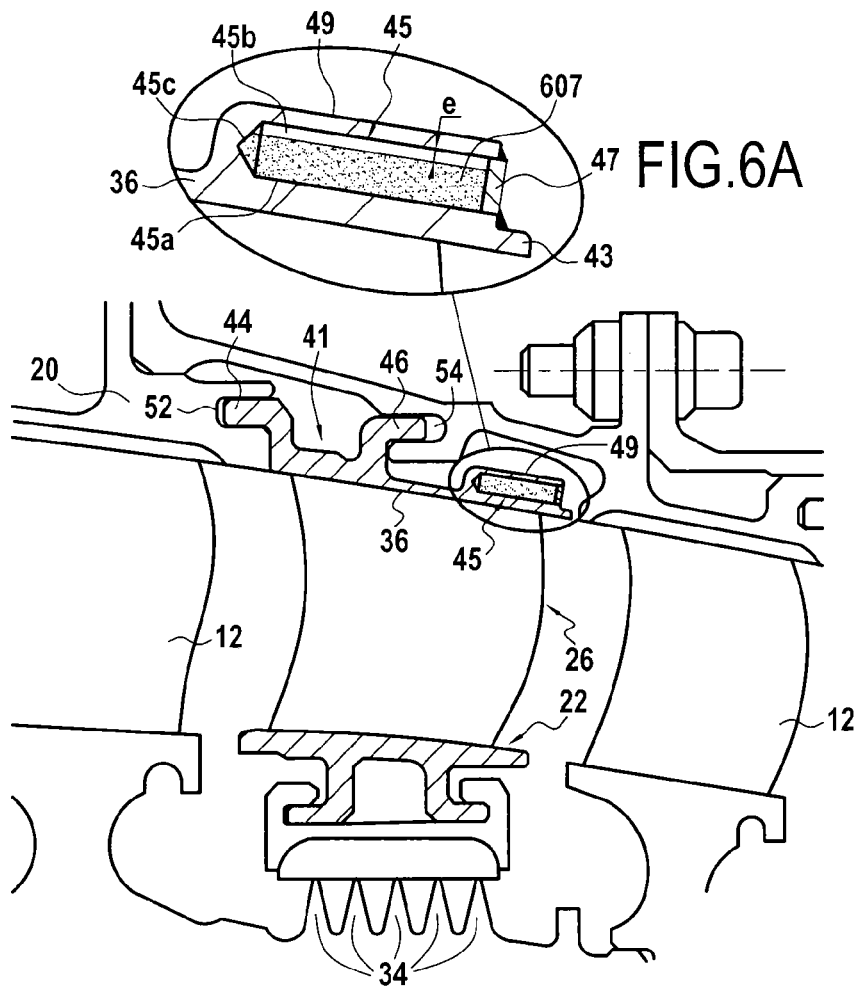
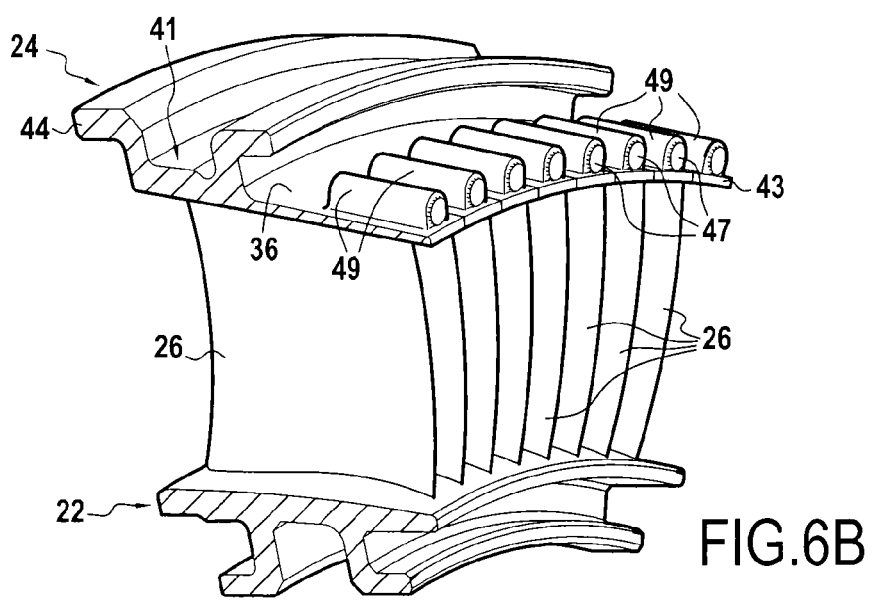

ANGULAR SECTOR OF A STATOR FOR A TURBINE ENGINE COMPRESSOR, A TURBINE ENGINE STATOR, AND A TURBINE ENGINE INCLUDING SUCH A SECTOR

BACKGROUND OF THE INVENTION

The present invention relates to the general field of stators for a compressor in a turbine engine such as an airplane turboprop or turbojet.

A compressor in a turbine engine is made up of a plurality of compression stages, each comprising both an annular row of moving blades mounted on a shaft of the engine, and also a stator mounted on an outer annular casing of the engine.

A compressor stator may be constituted by a ring, or it may be sectorized (i.e. made up of a plurality of angular sectors connected circumferentially end to end around the longitudinal axis of the compressor). Throughout the present application, the term "stator angular sector" (or "stator sector" to be more concise) is used to mean any angular sector of a stator and presenting an angle that is less than or equal to 360°.

Each stator sector has an outer shroud and an inner shroud that are arranged coaxially one in the other, together with one (or more) vane(s) extending radially between the shrouds and connected thereto via its (their) radial ends.

By way of example, each stator angular sector is mounted in the outer annular casing of the engine by means of mounting tabs provided at each axial end of the outer shroud of said sector for the purpose of being engaged in corresponding grooves in the casing.

In operation, such a stator sector is subjected to high levels of mechanical stress, both static stress and vibrational stress.

In prior art stators in which the leading and trailing edges of the vanes are connected to portions of the outer shroud that are very thick and very stiff, these mechanical stresses are essentially taken up by the leading edge and trailing edge zones connected to the outer shroud of the stator sector. Since these connection zones are thin and not very strong, there is a risk of the leading and trailing edges being damaged or even destroyed.

Document EP 1 811 131 proposes reducing the stress on the leading and trailing edges of the vanes of stator sectors by reducing the stiffness of the connections of the stator vanes in order to optimize the transition of forces from the vanes to the outer shroud. For that purpose, the leading and/or trailing edges of the vanes are connected to zones of the outer shroud that are less rigid than the zones of the outer shroud that are connected in particular to the mounting tabs. Nevertheless, that proposal does not provide satisfactory damping of the leading and trailing edges of the vanes in the connection zones where they are connected to the outer shroud, for the purpose of effectively avoiding the vanes breaking as a result of vibration.

OBJECT AND SUMMARY OF THE INVENTION

The present invention seeks to propose a stator angular sector that is effective in limiting the mechanical stresses to which each vane of the stator sector is subjected in operation, in particular at its leading and/or trailing edges.

This object is achieved with a stator angular sector for a turbine engine compressor, the sector extending around an axis of radial symmetry, and comprising: an outer shroud and an inner shroud arranged coaxially one inside the other; and at least one vane extending radially between said shrouds and connected thereto at its radial ends; in which the outer shroud has first and second mounting means for mounting the stator angular sector on a casing of the engine, said first and second mounting means being oriented parallel to the axis in opposite directions and being connected together by an intermediate portion; the sector being characterized in that the outer shroud has at least one axial end portion extending from said intermediate portion, provided with a free end, and connected to the radially-outer end of the vane; in that at least one damper-forming insert is suitable for coming into contact with the end portion; and in that beyond a given value for the amplitude of vibration of the end portion, the damper insert and the end portion are suitable for moving relative to each other so as to vary the total moving mass moving with the end portion, thereby modifying the vibratory behavior of said end portion.

In the present application, and unless specified to the contrary, "upstream" and "downstream" are defined relative to the normal flow direction of gas (from upstream to downstream) through the engine. Furthermore, the axis of the engine is the axis of radial symmetry of the engine. The axial direction corresponds to the direction along which the axis of the engine extends, and a radial direction is a direction perpendicular to said axis. Likewise, an "axial" plane is a plane containing the axis of the engine and a "radial" plane is a plane perpendicular to said axis. Unless specified to the contrary, the adjectives and adverbs "axial", "radial", "axially", and "radially", are used with reference to the above-specified axial and radial directions. Finally, unless specified to the contrary, the adjectives "inner" and "outer" are used relative to a radial direction in such a manner that an inner portion or face (i.e. the radially-inner portion or face) of an element is closer to the axis of the engine than is an outer face or portion of the same element (i.e. a radially-outer face or portion).

In the present application, the term "axial end portion" is used to designate a portion of the outer shroud that extends in the axial direction of the stator sector. Advantageously, this portion is directly connected to the portion of the vane where the vibratory activity for damping is located.

In the present invention, the damper-forming insert serves to oppose radial movements of the end portion in operation so that the levels of vibration of the vanes connected to the end portion can be limited. The interaction between the damper insert and the end portion is explained in greater detail below.

In one example of operation, the damper insert at rest is pressed against or is at least in contact with or secured to the end portion.

For a first range of amplitudes of vibration of the end portion, the damper insert and the end portion remain secured to each other and they vibrate together. The total moving mass secured to the end portion then corresponds to the sum of the masses of the end portion and of the damper insert.

Nevertheless, the damper insert is not connected to the end portion via a permanent connection. Consequently, when the end portion reaches a sufficient level of vibratory activity (i.e. when the radial movements of the end portion reach a limit value), then under the effect of inertia, the damper loses contact with or is no longer secured to the end portion. Under such circumstances, the damper insert and the end portion vibrate separately and the total moving mass secured to the end portion is equal to the mass of the end portion only.

By modifying the total moving mass that is secured to the end portion, the damper insert opposes the vibratory mode and modifies the vibration frequency. This prevents the vibratory mode of the stator entering into resonance. The damper insert is excited by an exciter source at a frequency that does not correspond to one of its own resonant frequencies, and the insert therefore does not enter into resonance, but rather contributes to opposing the movements of the shroud of the stator.

In another example of operation, contact between the end portion and the damper insert at rest is uncertain (not permanent). This loss of contact may arise as a result of the contacting faces becoming worn, for example. Under such circumstances, for small levels of vibration of the end portion, the total moving mass secured to said end portion is less than the sum of the masses of the damper insert and of the end portion.

When the end portion reaches a sufficient level of vibratory activity (i.e. when its radial movements are sufficient to overcome the initial clearance existing between the end portion and the damper insert), the damper becomes pressed against the end portion and its mass is added to the mass of the end portion. Once again, the change in the total moving mass that is secured to the end portion gives rise to a modification of the vibration frequency. Because of this frequency modification, there is no longer any resonance.

In an embodiment of the invention, the end portion cooperates with a substantially coaxial tongue arranged radially on its outside to define at least one cavity that opens out to an axial end of the outer shroud. In other words, the outer shroud includes, at least at one axial end, a cavity opening out to said axial end and extending between the end portion and an outer radial tongue carrying one of the first and second mounting means.

In a particular embodiment, the outer shroud includes an upstream cavity opening out to the upstream end of the outer shroud and a downstream cavity opening out to the downstream end of the outer shroud, at least one damper-forming insert being housed in at least one of said cavities. In an embodiment, at least one damper-forming insert may be provided in each cavity of the outer shroud. It can be understood that under such circumstances the outer shroud has a central intermediate portion connected to the upstream and downstream mounting means of the outer shroud, and two axial end portions, one extending upstream and the other downstream from said intermediate portion.

In an embodiment, the outer shroud is made as a single piece. In other words, the mounting means, the intermediate portion, and the axial end portion(s) all comprise a single piece. The outer shroud may for example be obtained directly by casting. In another variant embodiment, its shape may equally well be the result of performing a machining operation.

In another embodiment, the entire stator sector may be made as a single piece. In other words, the unit constituted by the outer shroud, the inner shroud, and the vane(s) constitutes a single-piece structure that is easier to make and stronger than a set of several parts assembled to one another.

In an embodiment of the invention, the damper insert is a ring portion suitable for being mounted without clearance on the axial end portion of the outer shroud. The ring portion may for example be a portion of a toroidal ring or of a ring that is substantially cylindrical.

In an embodiment, at least one recess of shape complementary to the shape of the damper insert is formed on the axial end portion, forming axial retaining means for the damper insert.

In an embodiment of the invention, the damper insert comprises a resilient spring-forming clip having a sleeve portion and a hook portion extending from said sleeve portion radially outwards and towards an open axial end of the outer shroud, said sleeve portion being suitable for bearing radially against the end portion of the outer shroud, and said hook portion being suitable for bearing radially against a surface opposite to said end portion, for example against the radially-outer tongue of the outer shroud or against a face of the casing of the engine. Throughout the present application, a "clip" is defined as being a ring portion comprising a sleeve portion and a hook portion extending from the sleeve portion radially outwards and towards the open end of the cavity in which it is received.

In another embodiment of the invention, the sleeve portion of the clip is suitable for bearing against the intermediate portion of the outer shroud. More particularly, and when the outer shroud has a cavity defined between the axial end portion and a radially-outer tongue, the sleeve portion of the clip is suitable for bearing via its axial end directed towards the inside of the cavity against a middle portion of the outer shroud connecting together the end portion and the radially-outer tongue and forming the end wall of the cavity. For this purpose, the sleeve portion may for example have a main portion that is substantially a portion of a cylinder, and it may be extended at its axial end directed towards the inside of the cavity by a portion that flares radially outwards.

The sleeve portion may also include at least one indentation in its radially-inner face. Such an indentation provides a saving in weight and enables contact between the clip and the end portion of the outer shroud to be better positioned.

In another embodiment of the invention, the radially-outer tongue of the outer shroud presents a projection directed radially towards the inside of the cavity, said projection forming an axial retention stop for said clip. In this way, it is possible to avoid mounting errors since the clip is held inside the cavity of the outer shroud. In particular, the clip is prevented from escaping from the cavity and being lost during mounting. This arrangement also makes it possible to avoid direct contact between the clip and the casing, thereby preserving the casing.

In another embodiment, the axial end portion defines at least a part of a chamber or enclosure that is closed and leaktight, having a flyweight or a damper-forming insert placed therein.

By way of example, the damper insert may be a solid, a powder, in particular a metal powder, or indeed a liquid (or some other material that melts at the operating temperature). The damper insert is preferably selected to be made of a material that is dense, e.g. steel, nickel, tungsten, depleted uranium, etc.

In general, the chamber should be almost completely filled so as to reduce relative movements between the damper insert and the chamber.

When using a powder, its grain size is preferably selected to be very fine so as to avoid the parameters of the system modifying over time.

The mode of operation is identical to that explained above. The damper insert moves between a position in which it is in contact with the axial end portion of the outer shroud and a position in which it is no longer in contact with said end portion. Nevertheless, under such circumstances, the end portion may be subjected to peening radially in both the outward and the inward directions.

In general, in all of the embodiments of the present invention, the damping of vibration in a vane can be summarized as follows.

The axial end portion of the outer shroud moves between a first limit position and a second limit position while it is vibrating.

In at least one of these two positions, the damper insert is in contact with the end portion.

In an intermediate position between the first and second positions, and/or if the damper insert comes into contact with the end portion in only one of these positions, then in the other one of these positions the damper insert is not in contact with the end portion.

Thus, in accordance with the invention, there exists at least one instant t1 when the total moving mass secured to the end portion is equal to the mass of said portion plus the mass of the damper insert, and at least one instant t2 when said mass is reduced to the mass of the end portion only.

By modifying the mass between the instants t1 and t2, the frequency is modified, such that the vibration is damped and resonance is avoided.

The invention also provides a turbine engine stator made of one or more stator angular sectors as defined above. The invention also provides a turbine engine including at least one such stator.

BRIEF DESCRIPTION OF THE DRAWINGS

Other characteristics and advantages of the invention appear on reading the following description of embodiments of the invention given by way of non-limiting illustration. The description refers to the sheets of the accompanying drawings, in which:

FIGS. 2A to 6C are fragmentary axial section views of angular stator sectors in other embodiments of the invention.

DETAILED DESCRIPTION OF EMBODIMENTS OF THE INVENTION

Figure 1A:
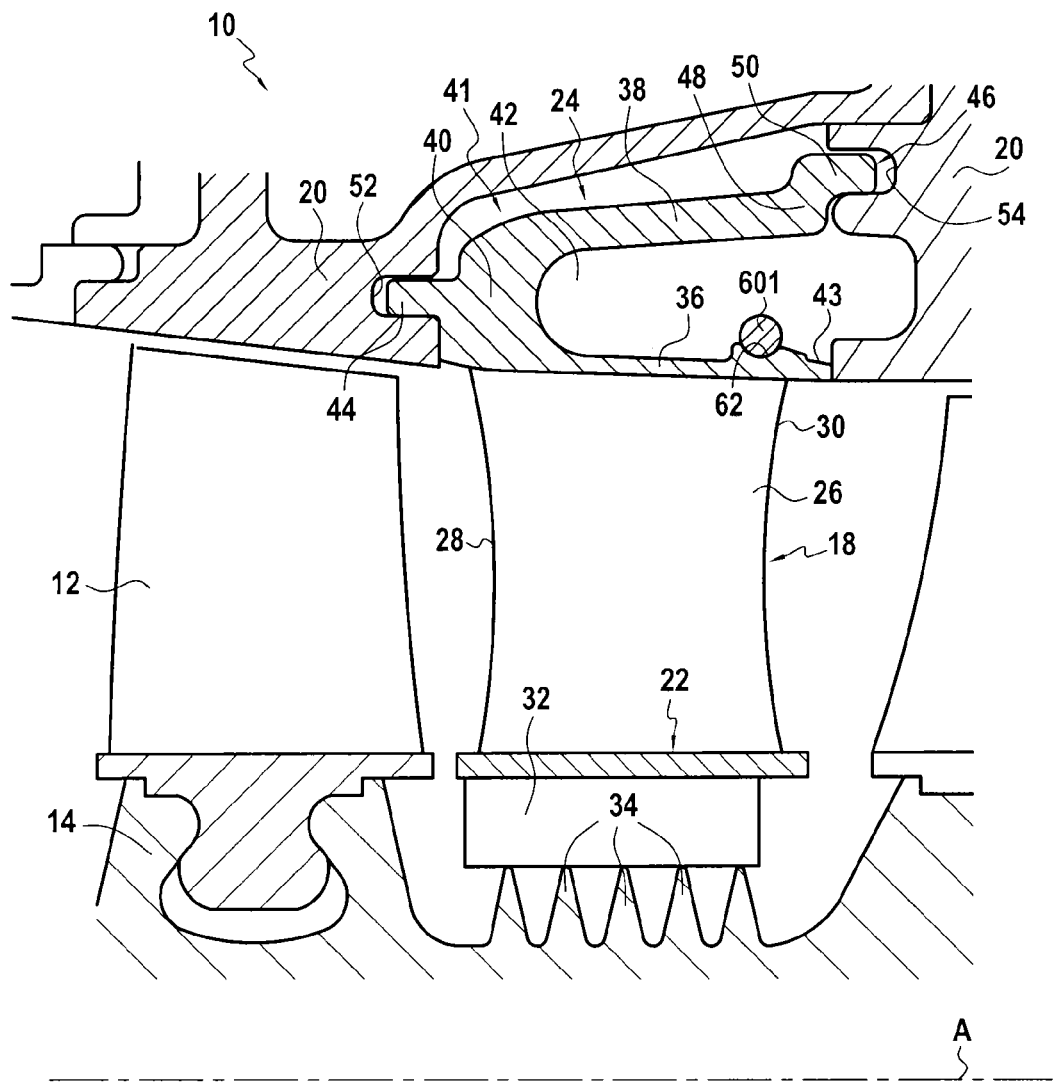
FIG. 1A is a fragmentary longitudinal section view of a turbine engine compressor including at least one stator angular sector in a first embodiment of the invention.

The compressor 10 shown diagrammatically and in part in FIG. 1A comprises a plurality of compression stages, with only two of them being shown. Each compression stage comprises an annular row of moving blades 12 mounted on a disk 14 carried by the rotor shaft (not shown) of the turbine engine, and a stationary stator 18 carried by an outer casing 20 of the engine and constituted by one or more angular stator sectors arranged circumferentially end to end. The axis of radial symmetry of the compressor is referenced A in FIG. 1A.

A stator sector 18 of the kind shown in FIG. 1A has inner and outer shrouds 22 and 24, e.g. forming portions of cylinders, extending one inside the other and connected together by one or more radial vanes 26. Each of these vanes 26 has a concave or pressure side surface and a convex or suction side surface, which surfaces are connected together at their upstream and downstream ends so as to form a leading edge 28 and a trailing edge 30 for the air that flows through the compressor 10.

The inner shroud 22 carries an abradable coating 32 on its inside surface for co-operating with radial wipers 34 carried by the rotor shaft (not shown) in order to avoid potential return flow of gas under the inner shroud 22.

In the example shown in FIG. 1A, the outer shroud 24 of the stator sector 18 is made as a single piece and has a radially-inner tongue 36 to which the outer radial ends of the vanes 26 are connected, and an radially-outer tongue 38 that is coaxial around said radially-inner tongue 36, the tongues being connected together by a middle portion 40.

Still in the example shown, the middle portion 40 is situated at the upstream end of the outer shroud 24, and the upstream ends of the radially-inner and -outer tongues 36 and 38 are attached directly thereto. A cavity 42 that is open to the downstream end of the outer shroud 36 is thus defined by the radially-inner and -outer tongues 36 and 38 (which form the walls of the cavity), and by the middle portion 40 (which constitutes the end wall of the cavity).

In an embodiment that is not shown, slots may also be made in the radially-inner tongue 36 between all or only some of the vanes 26 of the stator sector 18.

At each of its axial ends, the outer shroud 24 has means for mounting the stator sector 18 on the casing 20 of the engine. In FIG. 1A, these mounting means comprise an upstream mounting tab 44 in the form of a portion of a cylinder extending upstream from the middle portion 40, and a downstream mounting tab 46 formed at the end of the radially-outer tongue 38, made up of a ring portion 48 extending substantially radially outwards and a cylinder portion 50 extending downstream from the outer radial end of the ring portion 48. Each of these mounting tabs 44, 46 is for co-operating with a corresponding groove 52, 54 in the casing 20;

In this example, the radially-outer tongue 38 and the middle portion 40 form an intermediate portion 41 connecting together the mounting tabs 44 and 46.

The radially-inner tongue 36 forms an axial end portion extending from the intermediate portion 41, provided with a free end 43, and connected to the outer radial end of the vane 26.

It can readily be understood that the end portion 36 that is remote from the engagement between the mounting tabs 44, 46 and the grooves 52, 54 of the casing 20 presents stiffness that is much less than that of the zones (41) of the outer shroud 24 that are directly connected to said tabs 44, 46. The end portion 36 is advantageously as fine as possible, so as to make it even more flexible.

It should be observed that in a simplified variant embodiment, shown in FIGS. 3A to 5, the downstream mounting tab may also be constituted simply by a portion situated at the end of the radially-outer tongue 38 and in the form of a single portion of a cylinder 46'.

In the invention, the cavity 42 of the outer shroud 24 is to receive a damper-forming insert (referred to below as a "damper insert").

In the example of FIG. 1A, this damper insert is a toroidal ring for mounting in the annular cavity, e.g. formed by respective cavities 42 of a plurality of stator sectors 18 that are connected together circumferentially end to end to form the stator. More precisely, for a given stator sector, the damping action is exerted by the portion 601 of this toroidal ring that is housed in the cavity 42 of the stator sector and that extends over the same angular sector as the stator sector.

The toroidal ring may be constituted as a single annular piece. As a variant, it may equally well be made up from a plurality of ring portions connected end to end to one another in order to form a 360° ring. For this purpose, each ring portion may include at each of its two radial ends an element in the form of a hook, or any other mechanical junction means for holding two parts together under tension.

An annular groove portion 62 of shape substantially complementary to the ring section in an axial plane is provided in the outside face of the radially-inner tongue 36, and forms axial retaining means for the ring portion 601.

The ring portion 601 is preferably mounted without clearance on the stator sector. Nevertheless, its clamping may be optimized in extreme circumstances (in particular at the instants of resonances of critical modes), and in particular as a function of the temperature, of the differential expansion of the parts, etc.

The damping action of the ring portion 601 on the outer shroud 24 takes place as follows: at rest, the ring portion 601 is merely pressed against the radially-inner tongue 36 of the outer shroud 24. There is no part that impedes radial movement of the ring portion 601. In addition, there is no permanent connection of the welding, brazing, etc. type securing the ring portion 601 with the radially-inner tongue 36. In operation, over a first range of vibration amplitude values for the radially-inner tongue, the ring portion 601 and the radially-inner tongue 36 move as one (i.e. both of these parts vibrate together). When the radially-inner tongue 36 reaches a limit amplitude of vibration, the ring portion 601 separates from the radially-inner tongue, such that the total mass in movement together with the radially-inner tongue varies. This change in the mass and in the stiffness of the radially-inner tongue leads to a change in the frequency of the or each resonant mode of the part, which frequency no longer corresponds to the frequency of the exciting source(s) and is therefore attenuated. The situation generated by the presence of the ring portion 601 is an unstable situation that presents the advantage of not dissipating energy continuously.

Figure 1B:
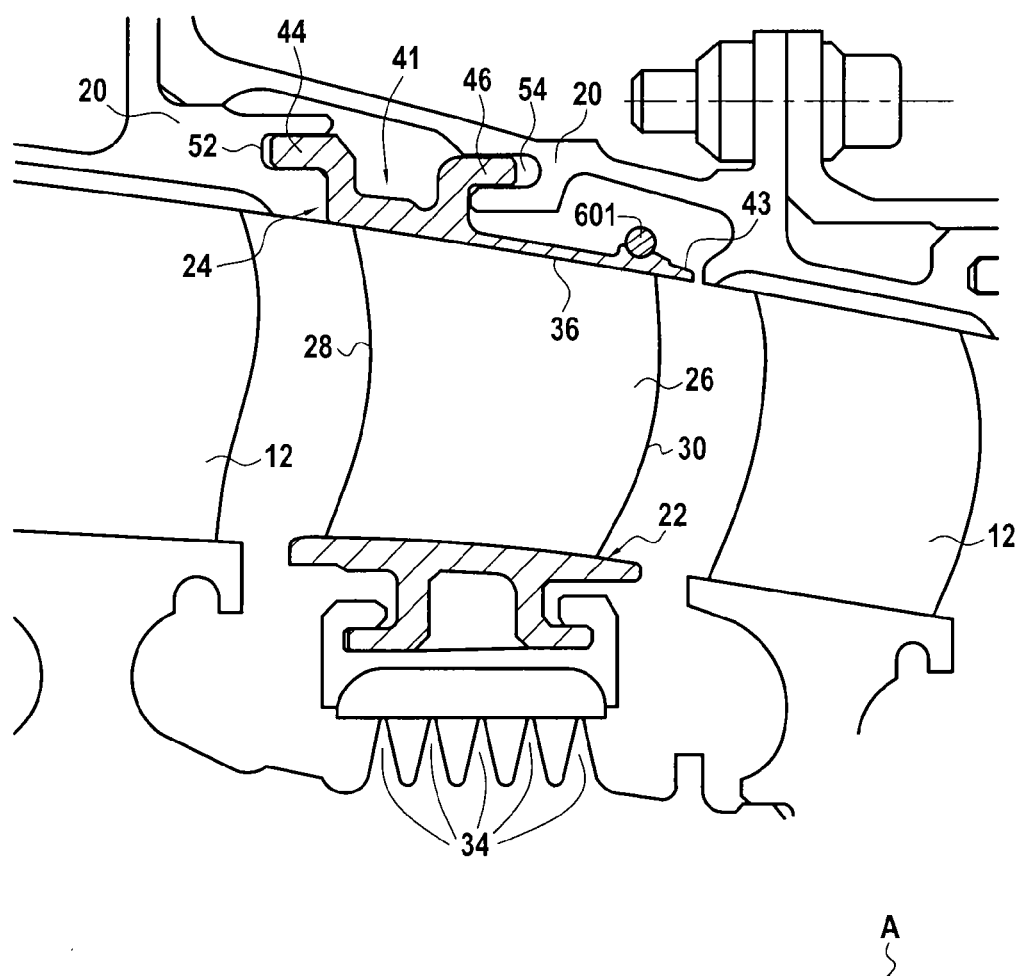
FIG. 1B shows a variant of the FIG. 1A embodiment.

FIG. 1B shows a variant of the FIG. 1A embodiment in which the outer shroud 24 of the stator sector does not have an axial cavity.

As in the above-described example, the outer shroud 24 has a first mounting tab 44 pointing upstream, a second mounting tab 46 pointing downstream, and an intermediate portion 41 connected to the two mounting tabs 44 and 46 and also to a top end portion of the vane 26.

In this variant, the second mounting tab 46 is situated towards the middle of the outer shroud 24, as taken in its axial direction, i.e. it is situated further upstream than in the above-described example. The outer shroud 24 in this example does not have an outer radial tongue.

Only an end portion 36 connected to the top end of the vane 26 and facing a portion of the casing 20 of the engine extends downstream from the intermediate portion 41.

The damper insert 601 described above with reference to FIG. 1A may be positioned on this end portion 36 between the intermediate portion 41 and the free end 43 in order to operate in entirely similar manner.

Figure 2A:
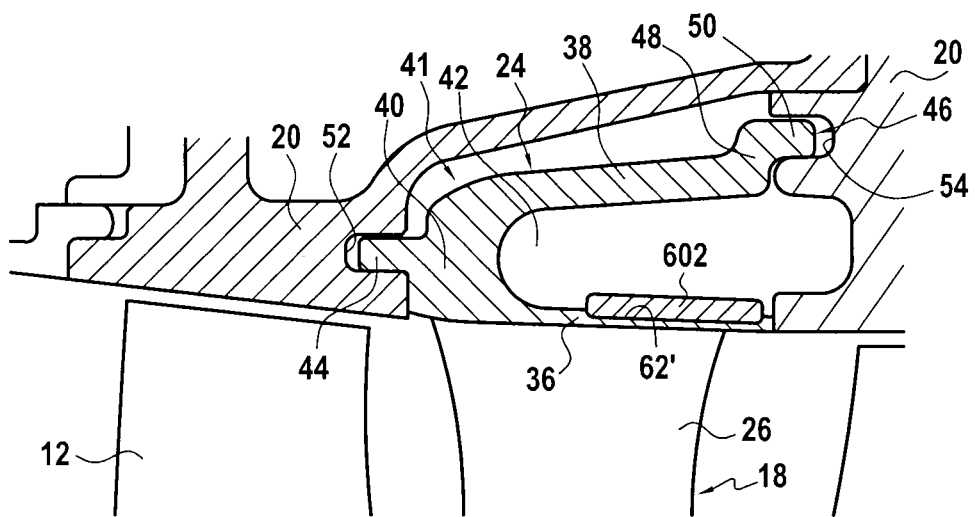
Figure 2B:
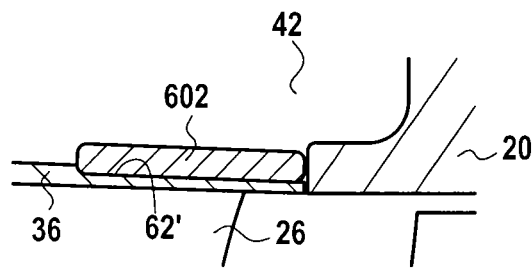

FIGS. 2A and 2B show a second embodiment of the invention in which the damper insert is a portion 602 of a cylindrical ring having its inside surface pressed at rest against the outside face of the radially-inner tongue 36. Compared with the embodiments of FIGS. 1A and 1B, this shape serves to increase the bearing area between the damper insert and the radially-inner tongue 36.

All elements that are common with the embodiment of FIGS. 1A and 1B are given the same numerical references and are not described again for reasons of concision. The operation of the damper insert 602 is also identical to that described with reference to FIG. 1A.

In the example of FIG. 2A, a recess 62' of shape complementary to that of the ring portion 602 is formed in the radially-inner tongue 36. This recess serves to hold the ring portion 602 axially once it is mounted in the cavity 42.

In an advantageous variant embodiment shown in FIG. 2B, provision may be made for the recess 62' to open out to the downstream end of the outer shroud 24. Such a recess makes it easier to insert the cylindrical ring in an axial direction given that the ring is relatively rigid due to its shape. In this configuration, the damper insert is held axially firstly by the recess 62' and secondly by the ring portion 602 bearing, after assembly, against the casing 20, or at least by the existence of a surface of the casing facing the axial end of the ring portion 602 once it is in place in the recess 62'.

The positioning of contacts between the ring portion 602 and the radially-inner tongue 36 of the outer shroud 24 may also be improved by an indentation (not shown) formed in the radially-inner face of the ring portion 602.

In other embodiments, the damper insert may be a ring portion having any other appropriate section or mass. Its position inside the cavity in the axial direction may also be optimized.

Advantageously, the damper insert should be positioned in a zone where the radial movements of the outer shroud are the greatest. Generally, the ring should be placed as close as possible to the free edge of the radially-inner tongue 36.

Figure 3A:
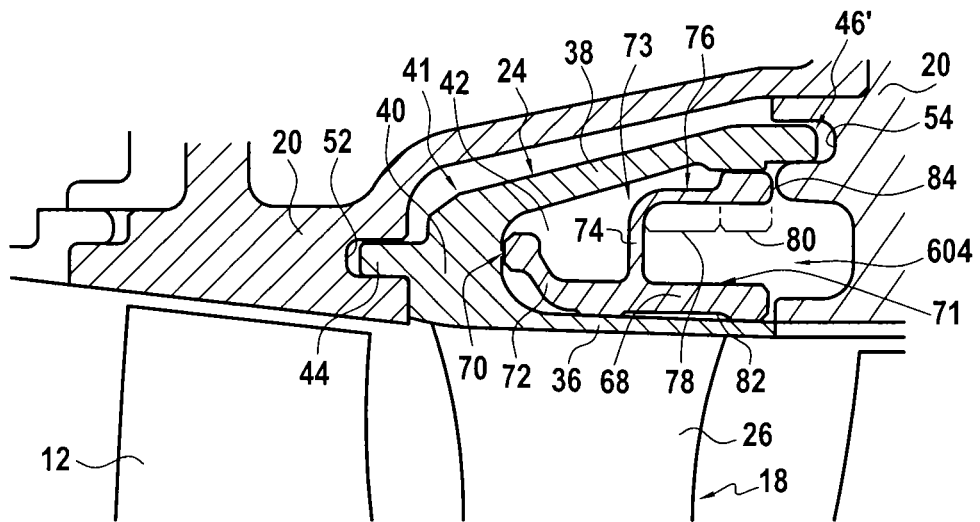

FIG. 3A shows a third embodiment of the invention in which the damper insert is a resilient spring-forming clip 604 that is to bear against the radially-inner and radially-outer tongues 36 and 38 of the outer shroud 24 once inserted inside the cavity 42.

As can be seen in FIG. 3A, the clip 604 presents, in an axial plane, a section in the shape of a lower-case h with its vertical portion lying on the radially-inner tongue 36 of the outer shroud 24. More particularly, the clip 604 is a ring portion having a sleeve portion 71 and a hook portion 73 extending from said sleeve portion 71 in a radially outward direction and then towards the open end of the cavity 42. The sleeve portion 71 and the hook portion 73 form a spring that bears radially against the radially-inner tongue 36 and the radially-outer tongue 38 of the outer shroud 24 with a weak clamping force. The flexibility of the clip 604 needs to be optimized in order to obtain good contact with the radially-inner and -outer tongues, while maintaining sufficient flexibility to damp the vibrations of the radially-inner tongue, as explained in greater detail below.

The sleeve portion 71 has a main portion 68 substantially in the form of a cylinder and extended at its axial end pointing towards the inside of the cavity 42 by a portion 72 that flares radially outwards.

As can be seen in FIG. 3A, an axial end face 70 of the flared portion 72 may bear, after mounting, against the end wall of the cavity 42, i.e. against the middle portion 40, and more particularly against a face of the middle portion 40 that extends substantially in a radial plane.

The inside face of the main portion 68 bears against the radially-inner tongue 36 of the outer shroud 24.

In the example shown, an indentation 82 formed in the radially-inner face of the main portion 68 serves also to achieve a saving of mass and improved positioning of the contacts between the clip 604 and the radially-inner tongue 36 of the outer shroud 24.

About halfway between its two axial ends, the sleeve portion 71 is extended by the hook portion 73 that itself has a middle portion 74 constituting a portion of the ring extending radially outwards from the main portion 68, and an end portion 76 that is substantially in the form of a portion and that extends from the radially-outer end of the ring portion 74 towards the outside of the cavity 42 (downstream in this example).

A radially-outer face of the hook portion 73 may bear firmly against the radially-outer tongue 38.

In order to ensure that it does bear firmly, the end portion 76 has a bearing portion in the form of extra thickness that extends radially outwards, with the radially-outer face of the extra thickness bearing against the facing surface of the radially-outer tongue 38.

In the embodiment shown in FIG. 3A, the end portion 76 is made up of a thin first segment 78 that is optimized in terms of flexibility and that is connected to the ring portion 74, and of a second segment 80 that forms the bearing portion and that is situated to extend the first segment 78 while presenting a radially-outer diameter that is greater than that of the first segment 78. The radially-outer face of the second segment 80 constitutes a radial bearing surface suitable for coming into contact with the radially-outer tongue 38 of the outer shroud 24 once the clip 604 has been inserted in the cavity 42.

Figure 3B:
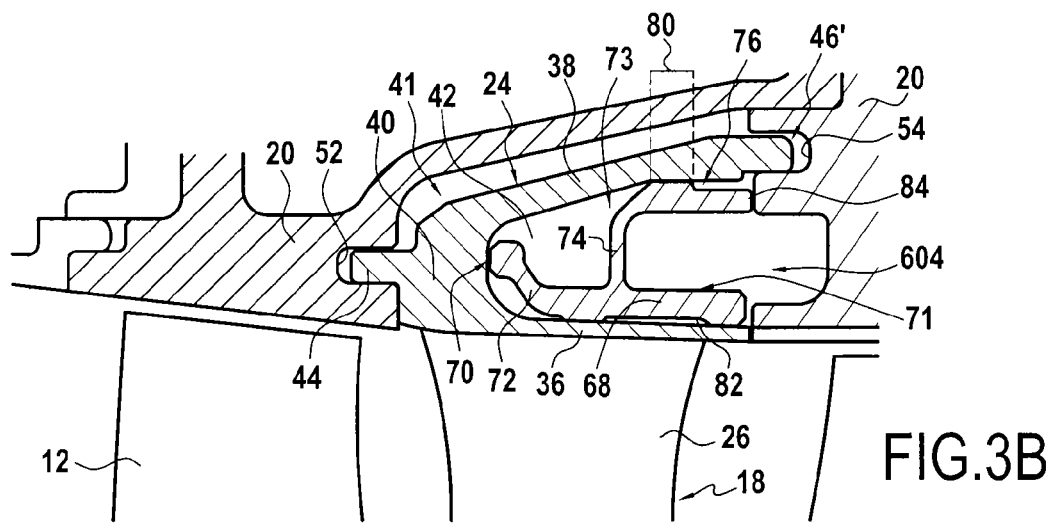

FIG. 3B shows an advantageous variant embodiment in which the bearing portion (extra thickness) 80 of the end portion 76 is positioned substantially in register with the middle of the indentation 82 as taken along the axial direction. This configuration serves to avoid the clip 604 toppling over.

The clip 604 may be annular or it may be made up of sectors.

When the clip 604 is sectorized, the angle of each angular sector may be equal to, less than, or greater than the angle of the stator sector on which the clip is to be mounted. Nevertheless, the clip will generally extend over an entire angular sector of the stator.

The hook portion 73 may optionally be in the form of one or more "sub-sectors", each extending in the circumferential direction over a fraction only of the angular sector occupied by the sleeve portion 71.

More specifically, the cylindrical portion 76 may be in the form of one or more "sub-sectors" of the hook portion 73, each sub-sector extending in the circumferential direction from a fraction only of the ring portion 74.

The clip 604 as described above can be inserted into the cavity 42 by sliding tangentially before the sector is mounted on the casing of the engine, when an angular sector of the stator 18 presents an angle of less than 360°, or else by sliding in the axial direction (in particular when an angular sector of the stator occupies) 360°.

As can be seen in FIGS. 3A and 3B, once the stator has been mounted, the clip 604 comes into abutment via its upstream end against the end wall of the cavity 42, and via the downstream end 84 of the hook portion 73 against the casing 20 of the engine. In this way, it is held axially in position inside the cavity 42.

In a variant or in addition, the clip 604 may also come to bear, after mounting, against the casing 20 via the downstream end of the sleeve portion 71.

In another variant embodiment, the main portion 68 of the clip 604 may be housed in a recess formed in the radially-inner tongue of the outer shroud. The clip 604 is then retained axially in the same manner as for the ring portions 601 and/or 602 of the embodiments of FIGS. 1, 2A, and 2B.

In yet another example, the extra thickness 80 of the cylindrical portion 76 may be configured so as to form a tongue suitable for being inserted during mounting in a corresponding groove of the radially-outer tongue 38, thereby retaining the clip 604 axially.

The clip 604 may also be prevented from moving tangentially by adding a blocking lug or any other stop means fitted on the outer shroud.

At rest, the clip 604 comes into contact with both walls of the cavity 42 in the outer shroud 24, and in particular with the radially-inner tongue 36 of the outer shroud 24. In operation, when the amplitude of the vibration of the radially-inner tongue is less than a given limit value, the clip 604 and the radially-inner tongue 36 vibrate while remaining in contact. When the radially-inner tongue 36 reaches and exceeds this limit amplitude of vibration, the clip 604 separates from the radially-inner tongue 36 so that the total mass moving with the radially-inner tongue 36 decreases. This modification to the mass and the stiffness of the radially-inner tongue 36 gives rise to a modification in the resonant frequency, and since it no longer corresponds to the frequency of the exciting source the vibration will attenuate.

Figure 4:
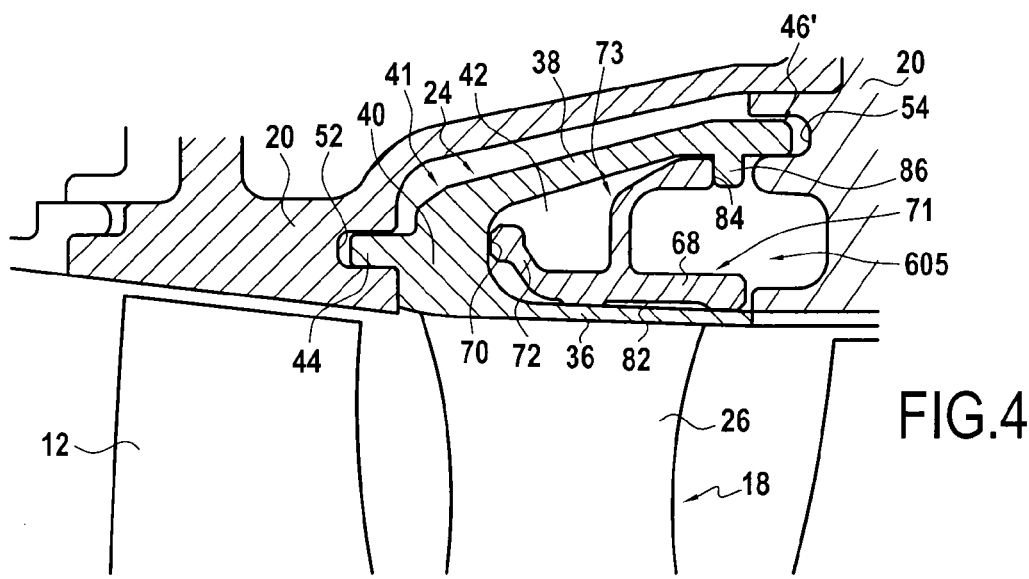

A fourth embodiment is described below with reference to FIG. 4.

In this embodiment, the damper insert is a clip 605 having the same structure as the clip 604 described with reference to FIGS. 3A and 3B. In particular it likewise presents in an axial plane a section that is in the shape of a lower-case h with the vertical portion thereof lying on the radially-inner tongue 36 of the outer shroud 24. It is therefore not described again in detail.

This fourth embodiment differs from that of FIGS. 3A and 3B solely in that the radially-outer tongue 38 carries a projection 86 directly radially towards the inside of the cavity 42, thereby forming an axial retention stop for the damper insert in the form of a clip 605.

Thus, the end of the hook portion 73 bears both radially against the radially-outer tongue 38 and, via its downstream end face 84, axially against the retention stop 86.

The clip 605 is thus held axially inside the cavity 42 of the outer shroud 24 and cannot escape therefrom, in particular during mounting or before the stator sector 18 is mounted in the casing 20 of the engine. These arrangements also make it possible to avoid direct contact between the clip 605 and the casing 20, thereby protecting the casing against wear due to friction.

In this embodiment, the clip 605 will normally be mounted by tangential sliding.

Figure 5:
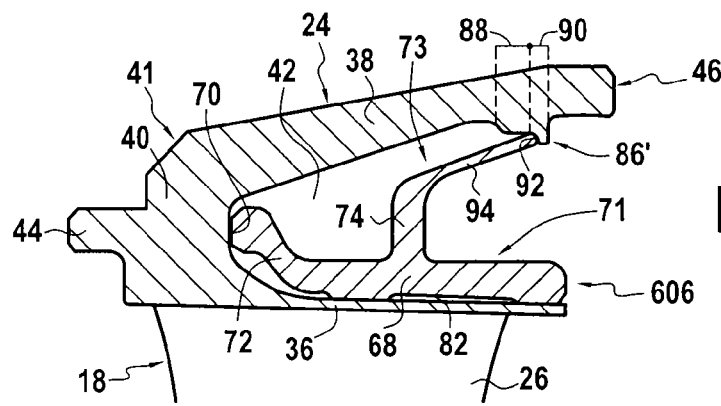

FIG. 5 shows a fifth embodiment of the invention.

In this embodiment, the radially-outer tongue 38 carries on its radially-inner face an axial retention stop 86' made up of a first segment 88 and a second segment 90 that is of inside diameter smaller than the inside diameter of the first segment 88, such that a shoulder 92 is formed between the first and second segments 88 and 90.

As in the third and fourth embodiments described above, the damper insert is a clip 606 presenting, in an axial plane, a section in the form of a lower-case h with its vertical portion bearing against the radially-inner tongue 36 of the outer shroud 24.

The clip 606 presents a sleeve portion 71 that is substantially identical to that of the clips 604 and 605, which sleeve portion is extended by a hook portion 73 having a middle portion 74 extending radially outwards and a flexible end portion 94 that is frustoconical in this example, flaring outwards from the radially-outer end of the middle portion 74.

Because of its shape and its small thickness, the end portion 94 presents resilient properties making it suitable, when the clip 606 is slid axially into the cavity 42, for flexing in co-operation with the second segment 90 of the axial retention stop 86' and for redeploying outwards once it has gone past it.

Once the clip 606 is mounted in the cavity 42, the upstream end face 70 of the sleeve portion 71 comes to bear against the middle portion 40 of the outer shroud 24, and the downstream end of the frustoconical portion 94 is held against the shoulder 92, whereby the clip 606 is held in position inside the cavity 42.

In this embodiment, and when the clip 606 is annular, it is necessary to provide a device for making disassembly possible.

By way of example, disassembly may be facilitated if the hook portion 73 is cut and presents festoons or crenellations enabling it to be flexed so as to be passed under the second segment 90 of the axial retention stop 86.

In the particular configuration in which the stator is made up of a plurality of angular sectors arranged end to end, a disassembly device must exist on at least one of the angular sectors, e.g. the sector that presents an endoscope hole. Under such circumstances, once this sector has been removed, the others can be removed even more easily by sliding tangentially into a zone that is configured to enable them to be taken away, on the principle of a bayonet fastener.

In all of the embodiments shown and described above, the trailing edges 30 are attached to the end of the axial end portion 36 (its downstream end in these examples) that is remote from the stiffer middle portion. The trailing edges 30 of the vanes 26 are thus attached to a portion of the outer shroud 24 that is not very stiff, and in any event that is less stiff than the portion to which the leading edges 28 of the vanes are attached. This configuration is particularly suitable when the trailing edges 30 of the vanes 26 are subjected in operation to radial movements that are greater than the movements to which the leading edges 28 are subjected.

In contrast, it is possible to envisage the outer shroud 24 having an intermediate portion 41 at its downstream end. Under such circumstances, the leading edges 28 of the vanes 26 would be attached to a portion of the outer shroud 24 (i.e. the distal end of the axial end portion 36) that is not as stiff as the portion to which the trailing edges 30 of the vanes 26 are attached. This configuration is particularly suitable when the leading edges 28 of the vanes 26 are subjected in operation to radial movements that are greater than those to which the trailing edges 30 are subjected.

It is also possible to envisage that the intermediate portion 41 is situated at a distance from the axial ends of the outer shroud 24, and is preferably situated substantially in the center of said shroud 24, taken along its axial direction.

Under such circumstances, the outer shroud 24 may for example have two cavities, an upstream cavity opening out to the upstream end of the outer shroud and a downstream cavity opening out to its downstream end. Each radial tongue of the outer shroud is then made up of two pairs of tongues, an upstream pair and a downstream pair, which pairs are connected together via the middle portion. The upstream cavity is defined by a portion of the upstream radially-inner tongue, a portion of the upstream radially-outer tongue, and the middle portion. In the same way, the downstream cavity is defined by a portion of the downstream radially-inner tongue, a portion of the downstream radially-outer tongue, and the middle portion.

It is possible to envisage that one or more damper-forming inserts are arranged in only one of the two cavities. It is also possible to envisage having at least one damper insert fitted in each of the cavities of the outer shroud.

This configuration is particularly suitable when the leading edges 28 and the trailing edges 30 of the vanes 26 are both subjected to high levels of vibratory activity, such that it is possible for completely decoupled vibratory modes to enter into resonance separately at the leading and trailing edges 28 and 30.

It should be observed that inserting a stop-forming element in a cavity of the outer shroud is facilitated when the height and the depth of the cavity are large.

In the embodiments shown in FIGS. 1A and 2A to 5, the upstream and downstream mounting means 44, 46, and 46' for mounting the stator sector 18 on the casing 20 of the engine are thus mutually offset in the radial direction. For example, in FIG. 1A, it can be seen in particular that the junction between the downstream mounting tab 46 (i.e. the mounting tab carried by the radially-outer tongue 38 and situated beside the cavity 42) and the corresponding groove 54 in the casing has been raised.

This arrangement makes it possible to increase the height (taken in the radial direction) of the outer shroud, and thus of the cavity 42.

When the cavity is made by machining, this arrangement also makes it possible to increase the depth of the cavity 42. Because of constraints associated with machining (constraints associated in particular with the specific tooling used), the height of the cavity 42 determines its depth. The greater the height of the cavity 42, the greater it is also possible to make the depth of the cavity, and the greater the radial movements that can be acted on by the damper.

It should be observed that all of the damper inserts described with reference to FIGS. 2A to 5 can co-operate in the same manner with an outer shroud as shown in FIG. 1B. Under such circumstances, the clips 604, 605, and 606 bear against the end portion 36 and also against a facing face of the casing 20 of the engine.

FIG. 6A shows a sixth embodiment of the invention in which the end portion 36 of the outer shroud 24 presents at least one boss 49 (shown in FIG. 6B that is described in greater detail below), in which a chamber 45 is machined that is suitable for being closed by a welded seal or cap 47.

The chamber 45 is defined by a radially-inner face 45a, a radially-outer face 45b, and lateral sides 45c.

It is filled to a large extent with a damper insert 607 in the form of a liquid, a metal powder, or a solid element of particular shape. As shown in the detail view of FIG. 6A, clearance e is conserved at rest between the damper insert 607 and one of the radially-inner face 45a and the radially-outer face 45b of the chamber 45 (depending on the orientation of the stator sector).

In order to avoid leaks, the chamber 45, closed by the cap 47, is completely leaktight.

For the damper insert 607, it is preferable to select a material that is very dense, of the steel or nickel type.

The operating principle of this embodiment is similar to that of those described above.

At rest and for small vibrations of the end portion, the damper insert 607 is in contact with one of the radially-inner and -outer faces of the chamber 45.

When the end portion reaches a determined amplitude of vibration, then under the effect of inertia, the damper insert 607 moves so as to occupy an intermediate position in which it is no longer in contact with either of the radially-inner and -outer faces 45a or 45b of the chamber 45.

At that moment, the total mass moving with the end portion 36 is modified.

Thereafter, the damper insert 607 strikes the other one of the radially-inner face 45a and the radially-outer face 45b of the chamber 45, once more modifying the total moving mass.

By modifying this total mass, the damper insert 607 modifies the resonant frequency and thus makes it possible in the long term to avoid the vanes breaking as a result of vibration fatigue.

It should be observed that although the chamber may be machined directly in the end portion 36 of the outer shroud, as described above, it is also possible to form it as a insert by welding various elements forming the lateral side 45c and the radially-outer face 45b of the chamber 45 onto the end portion 36. Under such circumstances, only the radially-inner face 45a of the chamber 45 is constituted by end portion 36 of the outer shroud 24.

FIG. 6B is a perspective view of a stator sector in the present embodiment. In this embodiment, a plurality of vanes extend radially between the inner shroud 22 and the outer shroud 24. In order to guarantee that it is flexible, the axial end portion 36 is preferably sectioned so that each of its sections carries one of the vanes 26.

In the example shown, the chamber 45 containing the damper insert 607 extends over a limited fraction of the end portion 36. The damper made in this way thus performs localized damping.

It should nevertheless be observed that the shape or the orientation of the chamber 45 is not limited to the embodiment shown, the essential point being that the chamber remains located at the point or close to the point of maximum local movement of the end portion 36.

Figure 6C:
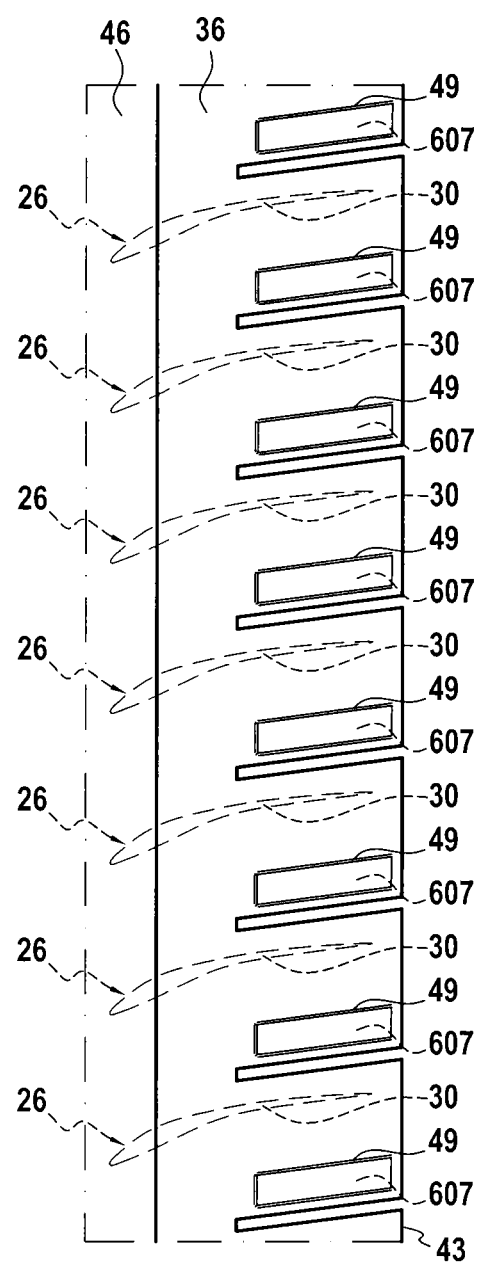

FIG. 6C is a diagrammatic view showing the fact that the damper insert 607 (and thus in this embodiment the chamber 45) is preferably placed as far as possible from the end of the vane 26.

The invention claimed is:

1. A stator angular sector for a turbine engine compressor, the sector extending around an axis of radial symmetry, and comprising:
    an outer shroud and an inner shroud arranged coaxially one inside the other; and
    at least one vane extending radially between the shrouds and connected thereto at its radial ends;
    wherein the outer shroud includes first and second mounting means for mounting the stator angular sector on a casing of the engine, the first and second mounting means being oriented parallel to the axis in opposite directions and being connected together by an intermediate portion;
    wherein the outer shroud includes at least one axial end portion extending from the intermediate portion, provided with a free end, and connected to the radially-outer end of the vane;
    wherein at least one damper-forming insert is configured to come into contact with the end portion; and
    wherein beyond a given value for amplitude of vibration of the end portion, the damper-forming insert and the end portion are configured to move relative to each other so as to vary the total mass moving with the end portion, thereby modifying vibratory behavior of the end portion.

2. A stator angular sector according to claim 1, wherein the outer shroud includes, at least at one axial end, a cavity opening out to the axial end, the cavity extending between the end portion and the intermediate portion.

3. A stator angular sector according to claim 2, wherein the outer shroud includes an upstream cavity opening out to an upstream end of the outer shroud and a downstream cavity opening out to a downstream end of the outer shroud, at least one damper-forming insert being housed in at least one of the cavities.

4. A stator angular sector according to claim 2, wherein the damper-forming insert comprises a spring-forming clip including a sleeve portion and a hook portion extending from the sleeve portion radially outwards and towards an open axial end of the outer shroud, the sleeve portion configured to bear radially against the end portion of the outer shroud, and the hook portion configured to bear radially against a surface opposite to the end portion.

5. A stator angular sector according to claim 4, wherein the hook portion is configured to bear against the intermediate portion of the outer shroud.

6. A stator angular sector according to claim 4, wherein the sleeve portion includes at least one indentation in its radially-inner face.

7. A stator angular sector according to claim 4, wherein the intermediate portion of the outer shroud carries a projection directed radially towards the inside of the cavity, the projection forming an axial retention stop for the clip.

8. A stator angular sector according to claim 1, wherein the outer shroud is made as a single piece.

9. A stator angular sector according to claim 1, wherein the damper-forming insert is a ring portion configured to be mounted without clearance on the end portion of the outer shroud.

10. A stator angular sector according to claim 9, wherein the ring portion is a portion of a toroidal ring.

11. A stator angular sector according to claim 9, wherein the ring portion is a substantially cylindrical ring portion.

12. A stator angular sector according to claim 1, wherein at least one recess of shape complementary to a shape of the damper-forming insert is formed on the end portion, forming axial retaining means for the damper-forming insert.

13. A stator angular sector according to claim 1, wherein the end portion defines at least part of a leaktight chamber having the damper-forming insert placed therein.

14. A stator angular sector according to claim 13, wherein the damper-forming insert is a powder.

15. A stator angular sector according to claim 14, wherein the damper-forming insert is a liquid.

16. A turbine engine stator comprising one or more stator angular sectors according to claim 1.

17. A turbine engine comprising at least one stator according to claim 16.

* * * * *